United States Patent
Al Dughaish

(10) Patent No.: US 10,411,640 B2
(45) Date of Patent: Sep. 10, 2019

(54) INTEGRATED RENEWABLE ENERGY HARVESTING SYSTEM

(71) Applicant: Fahad Al Dughaish, Oakland, CA (US)

(72) Inventor: Fahad Al Dughaish, Oakland, CA (US)

(*) Notice: Subject to any disclaimer, the term of this patent is extended or adjusted under 35 U.S.C. 154(b) by 292 days.

(21) Appl. No.: 15/644,302

(22) Filed: Jul. 7, 2017

(65) Prior Publication Data

US 2019/0013765 A1    Jan. 10, 2019

(51) Int. Cl.
| | |
|---|---|
| *H02S 10/12* | (2014.01) |
| *H02S 40/38* | (2014.01) |
| *H02S 50/00* | (2014.01) |
| *H02S 20/30* | (2014.01) |
| *H02S 30/20* | (2014.01) |
| *H02S 20/10* | (2014.01) |
| *H02J 7/35* | (2006.01) |

(52) U.S. Cl.
CPC ............... *H02S 10/12* (2014.12); *H02J 7/35* (2013.01); *H02S 20/10* (2014.12); *H02S 20/30* (2014.12); *H02S 30/20* (2014.12); *H02S 40/38* (2014.12); *H02S 50/00* (2013.01)

(58) Field of Classification Search
CPC .......... H02S 20/30; H02S 20/10; H02S 30/20; H02S 40/38; H02S 50/00
USPC .......................................................... 307/72
See application file for complete search history.

(56) References Cited

U.S. PATENT DOCUMENTS

| | | | | |
|---|---|---|---|---|
| 2008/0173345 A1* | 7/2008 | Cochran | ............... | H02N 2/185 |
| | | | | 136/248 |
| 2009/0071526 A1* | 3/2009 | Parker | ..................... | F24V 30/00 |
| | | | | 136/205 |
| 2010/0212653 A1 | 8/2010 | McDonald | | |
| 2011/0125336 A1* | 5/2011 | Groves | ..................... | H02J 3/14 |
| | | | | 700/287 |
| 2012/0080071 A1* | 4/2012 | Kimbriel | ................... | E04H 6/08 |
| | | | | 136/246 |
| 2012/0085041 A1* | 4/2012 | Place | ..................... | H02S 20/30 |
| | | | | 52/173.3 |
| 2013/0263911 A1* | 10/2013 | Bryson | .................. | B60L 8/003 |
| | | | | 136/244 |
| 2018/0041038 A1* | 2/2018 | Deng | ....................... | H02S 20/32 |
| 2019/0154305 A1* | 5/2019 | Goodman | .............. | F24S 25/63 |

FOREIGN PATENT DOCUMENTS

IN     3456/CHE/2014     2/2016

* cited by examiner

*Primary Examiner* — Daniel Kessie
*Assistant Examiner* — Swarna N Chowdhuri
(74) *Attorney, Agent, or Firm* — Oblon, McClelland, Maier & Neustadt, L.L.P.

(57) ABSTRACT

A solar and wind energy harvesting system having a support structure with a pair of poles and a plurality of transversal members that extends between the pair of poles, a plurality of transducers affixed to a corresponding transversal member of the plurality of transversal members, a plurality of photovoltaic cells, wherein each photovoltaic cell is suspended from a corresponding transducer of the plurality of transducers and receives sunlight to provide sunlight input electricity and wind to bend the corresponding transducer and have the corresponding transducer provide wind input electricity, and a battery assembly that is electrically connected to the plurality of transducers and the plurality of photovoltaic cells to receive, regulate and store the solar input electricity and the wind input electricity.

20 Claims, 6 Drawing Sheets

INTEGRATED RENEWABLE ENERGY HARVESTING SYSTEM

GRANT OF NON-EXCLUSIVE RIGHT

This application was prepared with financial support from the Saudi Arabian Cultural Mission, and in consideration therefore the present inventor(s) has granted The Kingdom of Saudi Arabia a non-exclusive right to practice the present invention.

BACKGROUND

In today's energy market, producing electricity in a renewable way is essential.

Such a demand in renewable energy can be addressed by collecting or harvesting energy from renewable resources, which are naturally replenished quasi perpetually.

To this end, conventional renewable energy production systems that rely on sunlight or wind are employed such as wind mills or photovoltaic panels. Although such conventional renewable energy production systems are employed, they present important drawbacks. Notably, these conventional energy production systems may rely on large scale infrastructures to produce large amount of energy that is distributed through large scale and complex grid systems. Consequently, such conventional energy systems may be too cost prohibitive, inconvenient or even impracticable to be used by small isolated and/or nomad community and/or individual or be integrated in urban environments and/or structures, e.g. bridges, buildings, parks, and pavilions, where space is limited.

In addition, these conventional energy production systems may rely on a single renewable source of energy, e.g. the sunlight or the wind, and may have difficulties into following weather changes, and may become inoperative when one of the renewable sources of energy is lacking and/or change substantially.

Thus, a solar and wind energy harvesting system that can provide an integrated, adaptable, flexible, and convenient way for small isolated and/or nomad community to produce electricity by harvesting renewable energy provided by sunlight and wind is desired.

SUMMARY

Accordingly, the object of the present disclosure is to provide a solar and wind energy harvesting system that provides an integrated, scalable, flexible, and convenient way for small isolated and/or nomad community as well as urban environments and/or structures to produce electricity from sunlight and wind. In addition, the disclosed energy harvesting system can be easily scalable to fulfill small to large energy demands and provide an energy production that fits a large spectrum of energy production requirements.

The disclosed energy harvesting system harvest both solar and wind energies in an easy, simple, adaptable, and convenient way through an integrated and dynamic way by relying on a plurality of photovoltaic cells movably supported by a plurality of transducers.

In one non-limiting illustrative example, a solar and wind energy harvesting system is presented. The solar and wind energy harvesting system includes a support structure having a pair of poles, and a plurality of transversal members that extends between the pair of poles, a plurality of transducers affixed to a corresponding transversal member of the plurality of transversal members, a plurality of photovoltaic cells, wherein each photovoltaic cell is suspended from a corresponding transducer of the plurality of transducers and receives sunlight to provide sunlight input electricity and wind to bend the corresponding transducer and have the corresponding transducer provide wind input electricity, a battery assembly having a charge regulator to receive the sunlight input electricity and the wind input electricity and provide a regulated input electricity, a battery to receive the regulated input electricity, a solar input voltmeter positioned between the plurality of photovoltaic cells and the charge regulator to provide solar voltage readings commensurate with solar voltage values of the solar input electricity, and a wind output voltage adjuster positioned between the battery and the plurality of transducers to provide a wind output electricity to the plurality of transducers; and an electrical control unit configured to receive the solar voltage readings and the wind voltage readings, determine an optimum position of the plurality of photovoltaic cells based on the solar voltage readings, and actuate the plurality of transducers to position the plurality of photovoltaic cells at the optimum position.

In one non-limiting illustrative example, a solar and wind energy harvesting system is presented. The solar and wind energy harvesting system includes a support structure having a pair of poles, and a plurality of transversal members that extends between the pair of poles, a plurality of transducers affixed to a corresponding transversal member of the plurality of transversal members, a plurality of photovoltaic cells, wherein each photovoltaic cell is suspended from a corresponding transducer of the plurality of transducers and receives sunlight to provide sunlight input electricity and wind to bend the corresponding transducer and have the corresponding transducer provide wind input electricity, and a battery assembly that is electrically connected to the plurality of transducers and the plurality of photovoltaic cells to receive, regulate and store the solar input electricity and the wind input electricity.

In another non-limiting illustrative example, a method to harvest wind and solar energy draft through a solar and wind energy harvesting system is presented. The solar and wind energy harvesting system having a plurality of transducers affixed to a support structure and a plurality of photovoltaic cells suspended to the plurality of transducers. The method including estimating, via the plurality of transducers, available wind energy that can be generated by the plurality of transducers, estimating, via the plurality of photovoltaic cells available solar energy that can be generated by the plurality of photovoltaic cells, detecting an optimum position for the plurality of photovoltaic cells, and actuating the plurality of transducers to the optimum position.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1A:
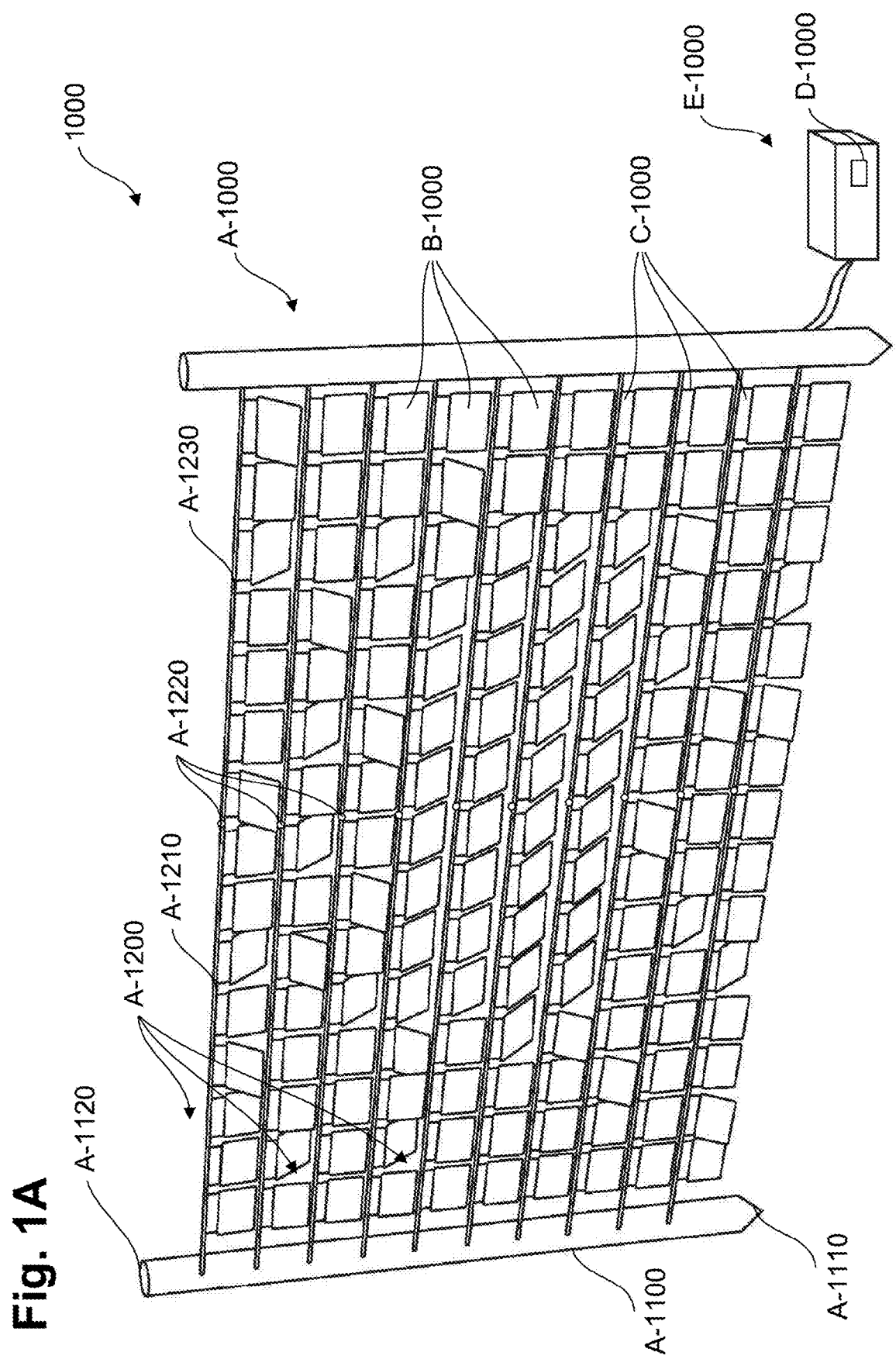
FIG. 1A is a perspective view of a solar and wind energy harvesting system in an extended configuration, according to certain aspects of the disclosure.

All publications, patent applications, patents, and other references mentioned herein are incorporated by reference in their entirety. Further, the materials, methods, and examples discussed herein are illustrative only and are not intended to be limiting.

In the drawings, like reference numerals designate identical or corresponding parts throughout the several views. Further, as used herein, the words "a", "an", and the like include a meaning of "one or more", unless stated otherwise. The drawings are generally drawn not to scale unless specified otherwise or illustrating schematic structures or flowcharts.

Figure 1B:
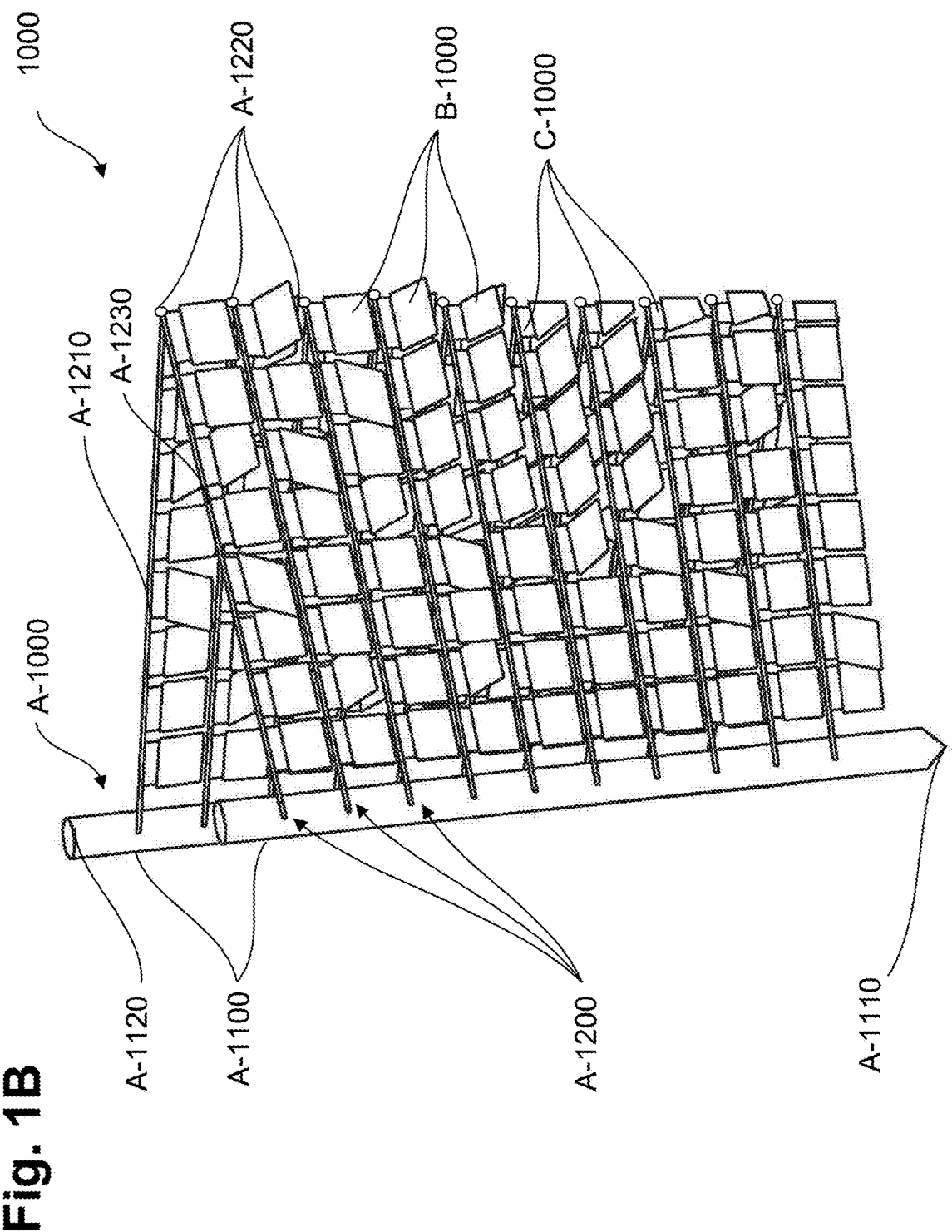
FIG. 1B is a perspective view of the solar and wind energy harvesting system in a folded configuration, according to certain aspects of the disclosure.

FIGS. 1A-1B are perspective views of a solar and wind energy harvesting system 1000 in a extended configuration and in a folded configuration, according to certain aspects of the disclosure.

The solar and wind energy harvesting system 1000 presented can provide an integrated, adaptable and convenient way for each individual and/or house to produce electricity by harvesting renewable energy provided by both sunlight and wind.

The solar and wind energy harvesting system 1000 can include a support structure A-1000, a plurality of transducers C-1000 affixed to the support structure, a plurality of photovoltaic cells B-1000 affixed to the plurality of transducers C-1000, a battery assembly E-1000 electrically connected to the plurality of transducers C-1000 and the plurality of photovoltaic cells B-1000, and an electrical control unit D-1000 in communication with the plurality of photovoltaic cells B-1000, the plurality of transducers C-1000, and the battery assembly E-1000.

The support structure A-1000 can provide support for the plurality of transducers C-1000 and expose the plurality of photovoltaic cells B-1000 to the sunlight and the wind with the plurality of transducers C-1000 flexibly supporting the plurality of photovoltaic cells B-1000 that is displaced by the wind.

The plurality of photovoltaic cells B-1000 can receive the sunlight and generate solar energy under the form of solar input electricity SIe.

The plurality of transducers C-1000 can receive the displacement of the plurality of photovoltaic cells B-1000 produced by the wind blowing on the photovoltaic cells B-1000 and generate wind energy under the form of wind input electricity WIe.

The battery assembly E-1000 can receive, convert, and store the solar input electricity SIe and the wind input electricity WIe. The stored energy can be later used in external elements of the solar and wind energy harvesting system 1000, e.g. laptop, cell phones, radio, lighting devices, lamps, through an electrical connection E-1110, e.g. USB connection, electrical power outlet, provided by the battery assembly E-1000. In addition, the stored energy can be injected into electrical grid systems, e.g. building electrical systems, road lighting systems, building heating systems, or the like.

Figure 4:
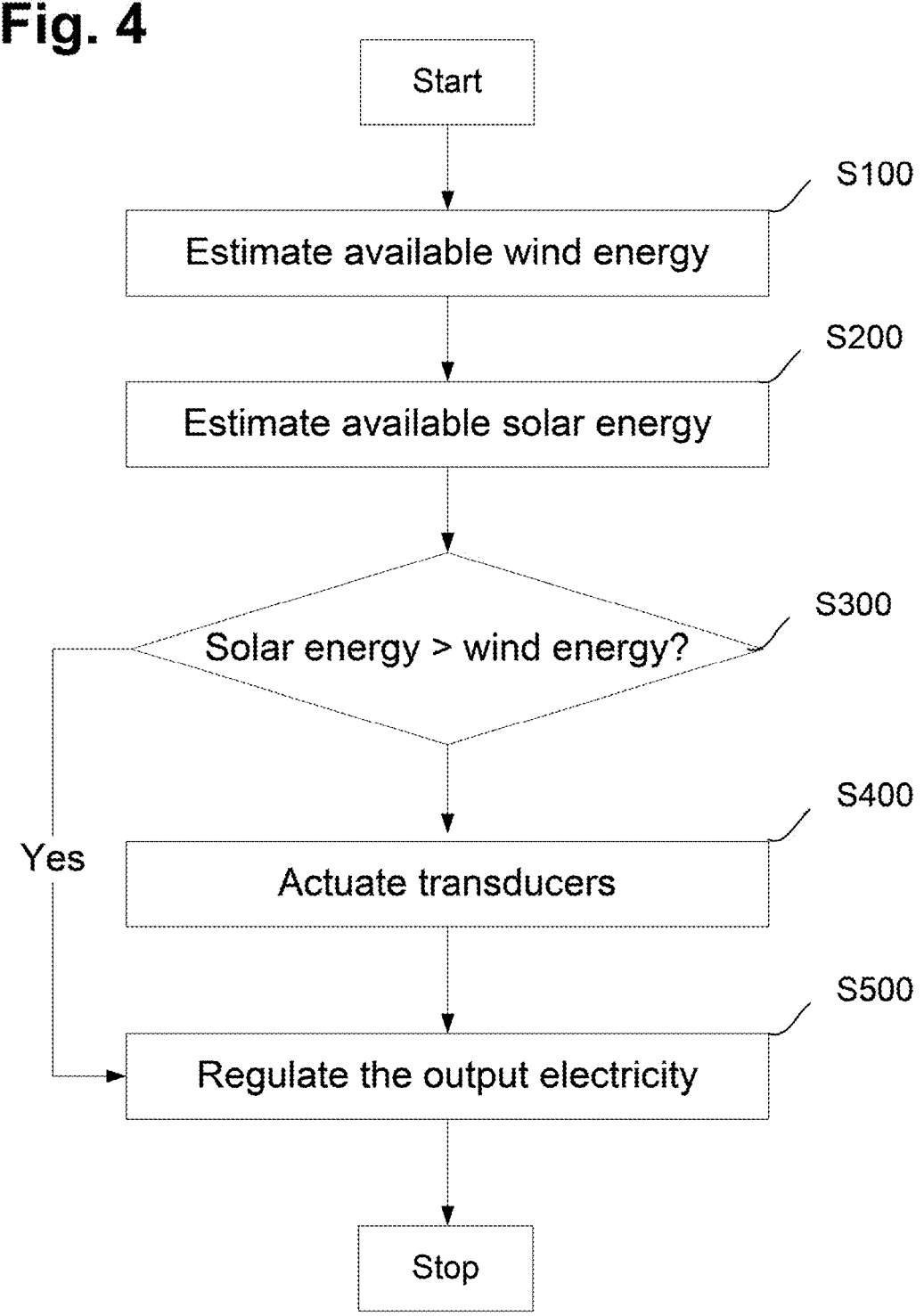
FIG. 4 is a flow chart of a method for harvesting energy through the solar and wind energy harvesting system, according to certain aspects of the disclosure.
Figure 5:
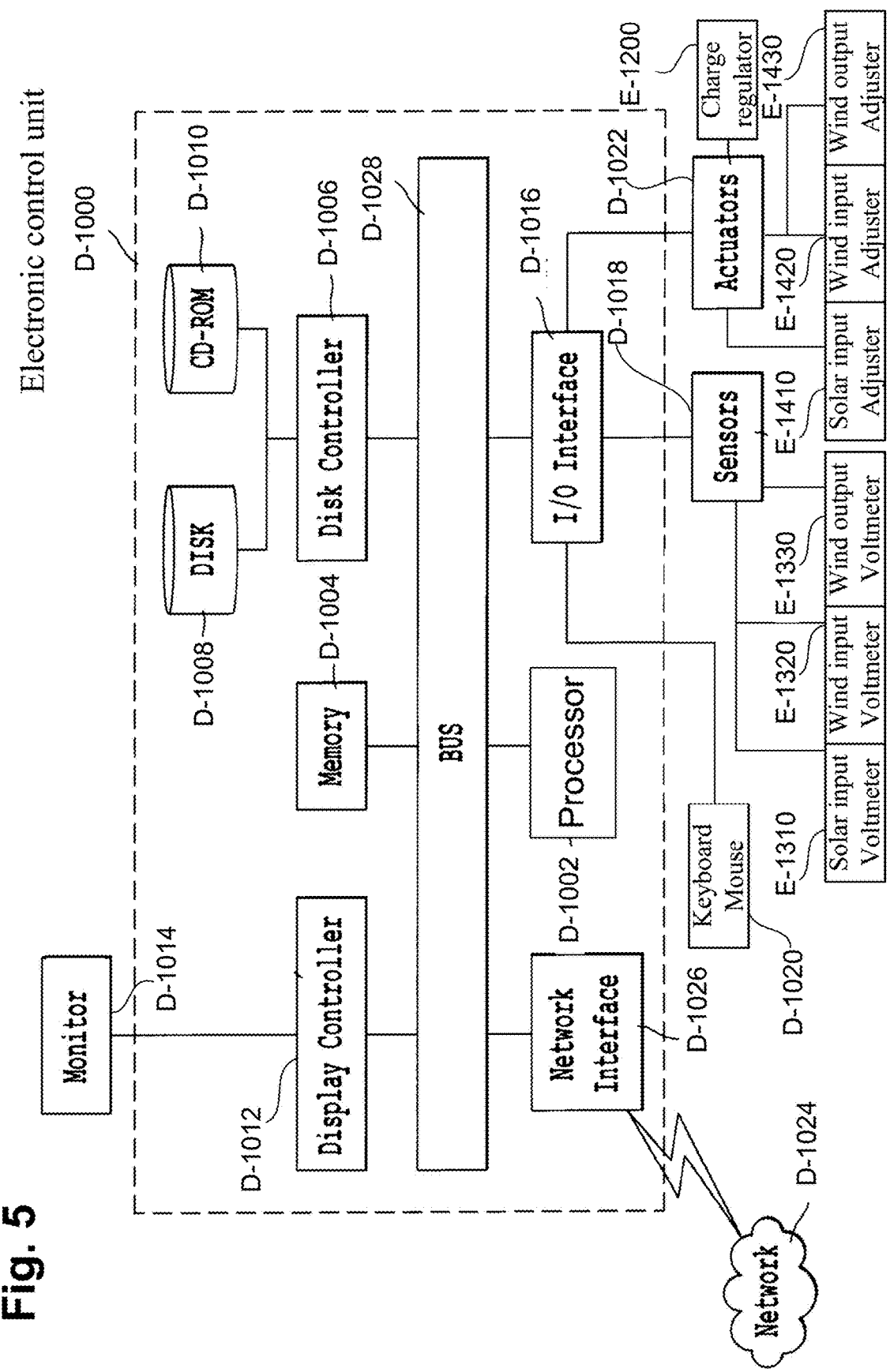
FIG. 5 is a schematic view of a hardware diagram of an electrical control unit of the battery assembly, according to certain aspects of the disclosure.

In addition, part of the energy stored in the battery assembly can be reinjected into the solar and wind energy harvesting system 1000 to further increase efficiency of the solar and wind energy harvesting system 1000. For example, the battery assembly E-1000 can provide wind output electricity WOe, as illustrated in FIG. 4, to articulate the plurality of photovoltaic cells B-1000 through the plurality of transducers C-1000 and to increase the exposition of the plurality of photovoltaic cells B-1000 to the sunlight.

The electrical control unit D-1000 can be configured to manage the battery assembly E-1000 in order to optimize and/or maximize energy harvesting by the solar and wind energy harvesting system 1000.

The support structure A-1000 can include a pair of poles A-1100 and a plurality of transversal members A-1200 extending between the pair of poles A-1100 that supports the plurality of transducers C-1000 and the plurality of photovoltaic cells B-1000.

The plurality of transversal members A-1200 can be positioned substantially perpendicular to the pair of poles A-1100 and substantially equidistant from each other to display the plurality of photovoltaic cells B-1000 in an array and maximize the exposure of the plurality of photovoltaic cells B-1000 to the sunlight and the wind.

The support structure A-1000 can provide a partially rigid structure that can articulated between an extended configuration, as illustrated in FIG. 1A, and a folded configuration as illustrated in FIG. 1B. In the extended configuration, the pair of poles A-1100 can be distant from each other to expose the plurality of photovoltaic cells B-1000 to the sunlight and the wind while in the folded configuration the pair of poles A-1100 can be adjacent to each other to facilitate the transport and displacement of the solar and wind harvesting energy system 1000.

The pair of poles A-1100 can be substantially rigid, e.g. metallic poles, while each transversal member of the plurality of transversal members A-1200 can include a first arms A-1210 and a second arm A-1230 joined by a pivot A-1220 to allow the support structure A-1000 to be articulated between the extended configuration, as illustrated in FIG. 1A, and the folded configuration, as illustrated in FIG. 1B.

Alternatively, each transversal member A-1200 can be a flexible structure, e.g. a cable, a chain link, a wire rope, or the like.

In addition, each pole of the pair of poles A-1100 can include a wedged extremity A-1110 to be inserted into a surface, e.g. ground, soil, and a flat extremity A-1120 to be struck with a mallet, or other source of mechanical power, to insert the wedged extremity A-1110 into the surface and allow the solar and wind energy harvesting system 1000 to be erected to face the sunlight and/or the wind.

In addition, instead of being supported by elements of the support structure A-1000, e.g. the pair of poles A-1100, the plurality of photovoltaic cells B-1000 and the plurality of transducers C-1000 can be supported by urban structures such as bridges, buildings, or the like, and or frames built on site and affixed to the urban structures to fit the energy production requirements of the solar and wind energy harvesting system 1000.

Figure 2:
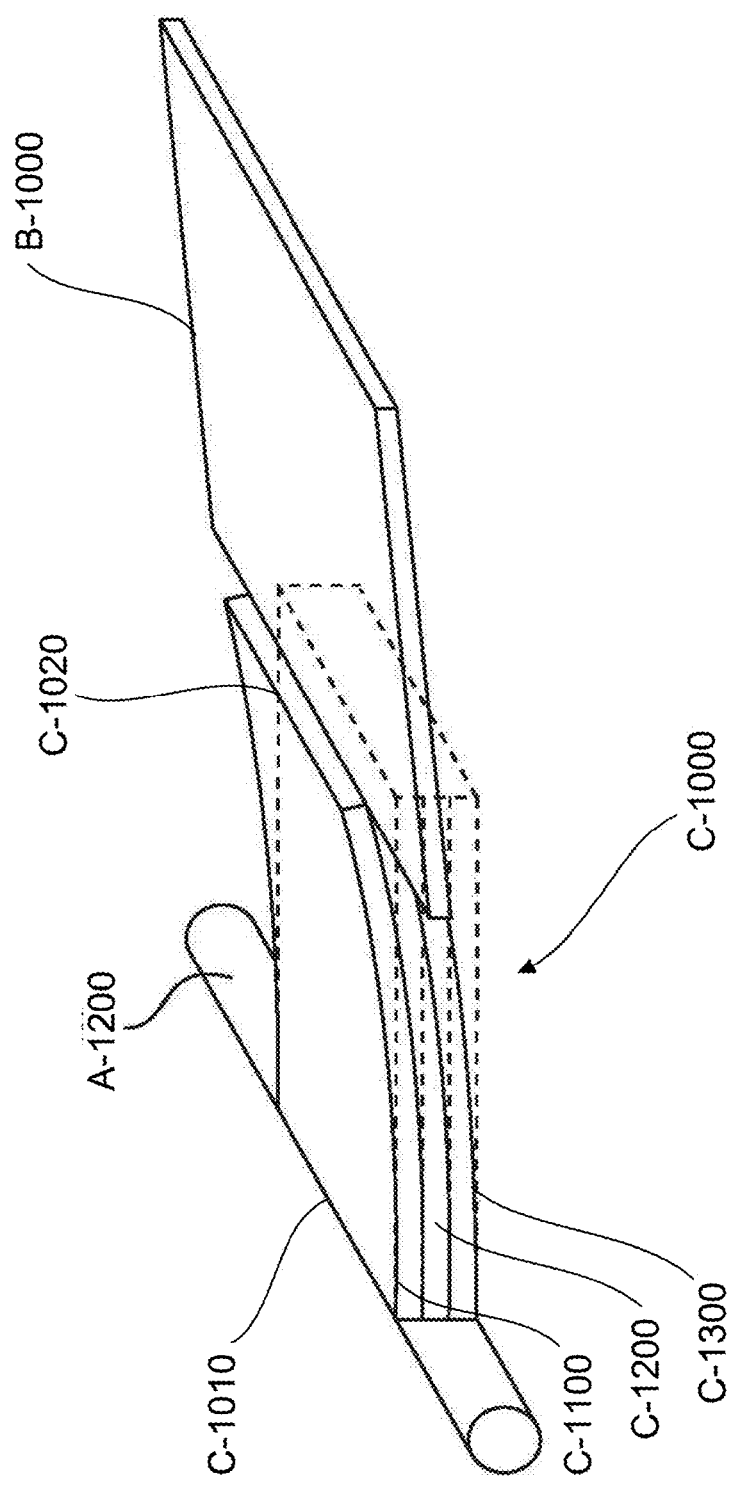
FIG. 2 is a perspective view of a transducer of the solar and wind energy harvesting system, according to certain aspects of the disclosure.

FIG. 2 is side view of one transducer of the plurality of transducers C-1000 of the solar and wind energy harvesting system 1000, according to certain aspects of the disclosure.

The plurality of transducers C-1000 can be configured to absorb mechanical energy exerted by wind blowing on the plurality of photovoltaic cells B-1000 and to convert the absorbed mechanical energy into electrical energy to provide the wind input electricity WIe.

Each transducer of the plurality of transducers C-1000 can have a first transducer extremity C-1010 affixed to the transversal member A-1200 and a second transducer extremity C-1020 that carries the photovoltaic cell B-1000 by one side to act as a cantilever that is bent when the wind blows on the photovoltaic cell B-1000.

Each transducer C-1000 can be a multilayered laminated element having a top layer C-1100, a bottom layer C-1300, and a middle layer C-1200 sandwiched between the top layer C-1100 and the bottom layer C-1300.

The top layer C-1100 and the bottom layer C-1300 can act as electrical insulators to be polarized while the middle layer C-1200 can act as an electrode. For example, the top layer C-1100 and the bottom layer C-1300 can contain polarizing electrical materials, such as piezoelectric ceramic particles while the middle layer C-1200 can contain electrical conductive materials, such as metallic particles.

When the wind blows on the photovoltaic cell B-1000, the transducer C-1000 bents which contracts the top layer C-1100 and stretches the bottom layer C-1300, as illustrated in FIG. 2 in solid lines, or stretches the bottom layer C-1300 and contracts the top layer C-1100.

The stretching and contraction of the top layer C-1100 and the bottom layer C-1300 can generate a polarization difference between the top layer C-1100 and the bottom layer C-1300 that is evacuated by the middle layer C-1300 as the wind input electricity WIe.

In addition, the plurality of transducers C-1000 can be configured to receive a wind output electricity WOe and convert the wind output electricity WOe into an imposed polarization difference between the top layer C-1100 and the bottom layer C-1300 and generate mechanical stresses to bend the plurality of photovoltaic cells B-1000.

Figure 3:
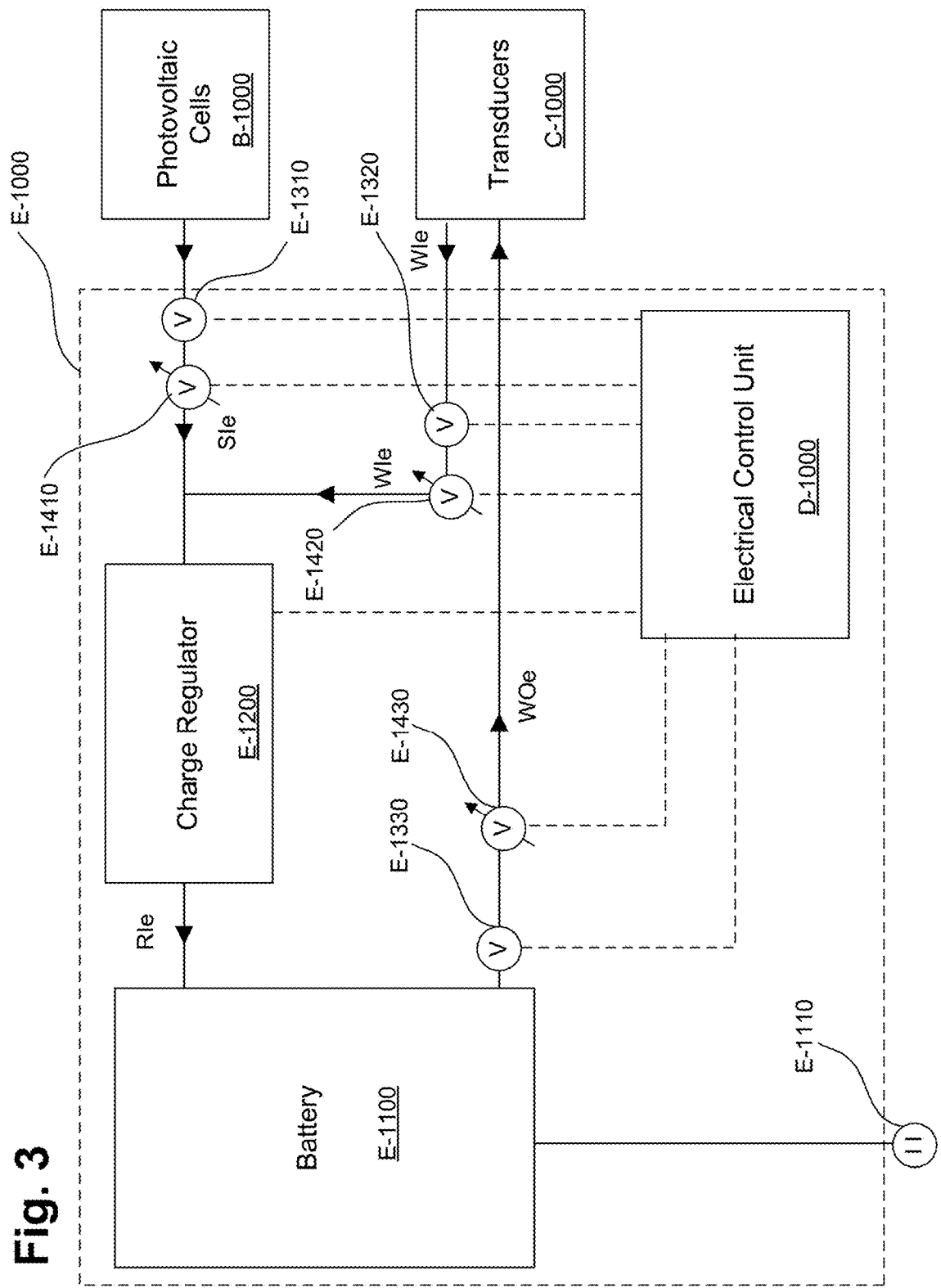
FIG. 3 is a schematic view of a battery assembly of the solar and wind energy harvesting system, according to certain aspects of the disclosure.

FIG. 3 is a schematic view of the battery assembly E-1000 of the solar and wind energy harvesting system 1000, according to certain aspects of the disclosure.

The battery assembly E-1000 can include a battery E-1100, a charge regulator E-1200 electrically connecting the plurality of photovoltaic cells B-1000 and the plurality of transducers C-1000 to the battery E-1100, a solar input voltmeter E-1310 positioned between the charge regulator E-1200 and the plurality of photovoltaic cells B-1000, a wind input voltmeter E-1320 positioned between the charge regulator E-1200 and the plurality of transducers C-1000, a wind output voltmeter E-1330 positioned between the battery E-1100 and the plurality of transducers C-1000, a solar input voltage adjuster E-1410 positioned between the solar input voltmeter E-1310 and the charge regulator E-1200, a wind input voltage adjuster E-1420 positioned between the wind input voltmeter E-1320 and the charge regulator E-1200, a wind output voltage adjuster E-1430 positioned between the wind output voltmeter E-1330 and the plurality of transducers C-1000, and an electronic control unit D-1000 that can read the solar input voltmeter E-1310, the wind input voltmeter E-1320, and the wind output voltmeter E-1330 and actuate the solar input voltage adjuster E-1410, the wind input voltage adjuster E-1420, the wind output voltage adjuster E-1430, and the charge regulator E-1200.

The charge regulator E-1200 can receive and regulate a combination of the solar input electricity SIe and the wind input electricity WIe from the plurality of photovoltaic cells B-1000 and the plurality of transducers C-1000 to provide a regulated input electricity RIe to the battery E-1100. The charge regulator E-1200 can prevent transferring over voltages to the battery E-1100 to enhance battery performance and lifespan by providing the regulated input electricity RIe as an average of the combination of the solar input electricity SIe and the wind input electricity WIe over a predetermined period of time. The charge regulator E-1200 can be a stand-alone device or circuitry integrated to the battery E-1100. To provide the regulated input electricity RIe, the charge regulator E-1200 can rely on Pulse Width Modulation (PWM) and/or Maximum Power Point-Tracker (MPPT) technologies.

In addition, the charge regulator E-1200 can rectify the combination of the solar input electricity SIe and the wind input electricity WIe that can be an alternative current and provide a direct current to the charge regulator E-1200.

The battery E-1100 can store the regulated input electricity RIe to be later used in external elements of the solar and wind energy harvesting system 1000, e.g. laptop, cell phones, radio, lighting devices, lamps, through the electrical connection E-1110 of the battery assembly E-1000. The battery E-1100 can be a single or a plurality of alkaline batteries, lead acid batteries, lithium-ion batteries, or the like.

The electrical control unit D-1000 can monitor and control the solar and wind energy harvesting system 1000 by receiving reading signals from the solar input voltmeter E-1310 indicative of a voltage value of the solar input electricity SIe, the wind input voltmeter E-1320 indicative of a voltage value of the wind input electricity WIe, and the wind output voltmeter E-1330 indicative of a voltage value of the wind output electricity WOe, as well as by providing command signals to the solar input voltage adjuster E-1410 indicative of a voltage decrease of the solar input electricity SIe, the wind input voltage adjuster E-1420 indicative of a voltage decrease of the wind input electricity WIe, the wind output voltage adjuster E-1430 indicative of a voltage increase of the wind output electricity WOe, and the charge regulator E-1200 indicative of a voltage adjustment of the combination of the solar input electricity SIe and the wind input electricity WIe.

The electrical control unit D-1000 and functionalities associated with the electrical control unit D-1000 will be described in details in following paragraphs and figures.

FIG. 4 is a flow chart of a method for harvesting energy through the solar and wind energy harvesting system 1000, according to certain aspects of the disclosure.

In a step S100, available wind energy that can be generated by the plurality of transducers C-1000 is estimated. The estimation of the available wind energy can be performed with voltage values of the wind input electricity WIe that is measured via the wind input voltmeter E-1310, see FIG. 7, and through software instructions executed by the electrical control unit D-1000. For example, during a predetermined period of time the electrical control unit D-1000 can receive readings from the wind input voltmeter E-1320 and record, through software instruction executed by a processor D-1002 and a memory D-1004 of the electrical control unit D-1000, wind voltage values commensurate with wind energy availability during the predetermined period of time. Furthermore, the electrical control unit D-1000 can be configured to detect a maximum wind energy availability corresponding to a maximum wind voltage value of the wind voltage values recorded.

In a step S200, available solar energy that can be generated by the plurality of photovoltaic cells B-1000 is estimated. The estimation of the available solar energy can be performed with voltage values of the solar input electricity SIc that is measured via the solar input voltmeter E-1320, see FIG. 7, and through software instructions executed by the electrical control unit D-1000. For example, the electrical control unit D-1000 can actuate the wind output voltage adjuster E-1430 to send to the transducer C-1000 increasing voltage values of the wind output electricity WOe to articulate the photovoltaic cell B-1000 along a predetermined course. During the articulation of the photovoltaic cell B-1000 along the predetermined course, the electrical control unit D-1000 can receive readings from the solar input voltmeter E-1310 and record, through software instruction executed by the processor D-1002 and the memory D-1004, voltage values commensurate with solar energy availability during the articulation of the photovoltaic cell B-1000. Furthermore, the electrical control unit D-1000 can be configured to detect a maximum solar energy availability and an optimal position of the photovoltaic cell B-1000 corresponding to a maximum solar voltage value of the voltage values recorded.

In a step S300, it is determined if the wind energy availability measured in the step S100 is lower than the solar energy availability measured in the step S200. The determination that the wind energy availability is lower than the solar energy availability can be performed by comparing the maximum solar energy availability measured in the step S300 with the maximum wind energy availability measured in the step S200 through software instructions executed by the electrical control unit D-1000. For example, if the maximum wind voltage value is lower than the maximum solar voltage value it is determined that wind energy availability measured is lower than the solar energy availability.

If it is determined that the wind energy availability is lower than the solar energy availability, the process goes to a step S400. Otherwise, the process goes to a step S500.

In the step S400, the electrical control unit D-1000 actuates the wind output voltage adjuster E-1430 to send to the transducer C-1000 a predetermined voltage value of the wind output electricity WOe to maintain the photovoltaic cell B-1000 at the optimum position detected in the step S200.

In the step S500, the combination of the solar input electricity SIe and the wind input electricity WIe is regulated to provide the regulated input electricity RIe via the charge regulator E-1200 and through software instructions executed by the electrical control unit D-1000. For example, the electrical control unit D-1000 can actuate the charge regulator E-1200 to reduce, e.g. through heat dissipation, the combination of the solar input electricity SIe and the wind input electricity WIe when summation of voltage values of the solar input electricity SIe and the wind input electricity WIe are above a predetermined maximum battery threshold. The predetermined maximum battery threshold can correspond to voltage values for which the battery E-1100 can be damaged.

In addition, the solar and wind energy harvesting system 1000 can be used as a shading system that can be optimized based on sunlight orientation and/or the available solar energy. For example, the electrical control unit D-1000 can actuate the wind output voltage adjuster E-1430 to send to each transducer C-1000 determined voltage values of the wind output electricity WOe to articulate and position each corresponding photovoltaic cell B-1000 in a predetermined position to block the sunlight, cast shadow, and prevent excessive heat gain.

Furthermore, the solar and wind energy harvesting system 1000 can be used as a privacy system. For example, the electrical control unit D-1000 can actuate the wind output voltage adjuster E-1430 to send to each transducer C-1000 determined voltage values of the wind output electricity WOe to articulate and position each corresponding photovoltaic cell B-1000 in a desired position selected by an user to block the view and provide privacy.

FIG. 4 is a schematic view of a hardware diagram of the electrical control unit D-1000 of the battery assembly E-1000, according to certain aspects of the disclosure.

FIG. 4 depicts the electrical control unit D-1000 to control the apparatus to draft a patent application. As shown in FIG. 4, systems, operations, and processes in accordance with this disclosure may be implemented using the processor D-1002 or at least one application specific processor (ASP). The processor D-1002 may utilize a computer readable storage medium, such as the memory D-1004 (e.g., ROM, EPROM, EEPROM, flash memory, static memory, DRAM, SDRAM, and their equivalents), configured to control the processor XX02 to perform and/or control the systems, operations, and processes of this disclosure. Other storage mediums may be controlled via a disk controller D-1006, which may control a hard disk drive D-1008 or optical disk drive D-1010.

The processor D-1002 or aspects thereof, in an alternate embodiment, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The processor D-1002 may be a separate device or a single processing mechanism. Further, this disclosure may benefit form parallel processing capabilities of a multi-cored processor.

In another aspect, results of processing in accordance with this disclosure may be displayed via a display controller D-1012 to a monitor D-1014 that may be peripheral to or part of the electrical control unit D-1000. Moreover, the monitor D-1014 may be provided with a touch-sensitive interface to a command/instruction interface. The display controller D-1012 may also include at least one graphic processing unit for improved computational efficiency. Additionally, the electrical control unit D-1000 may include an I/O (input/output) interface D-1016, provided for inputting sensor data from sensors D-1018 and for outputting orders to actuators D-1022. The sensors D-1018 and actuators D-1022 are illustrative of any of the sensors, e.g. the solar input voltmeter E-1310, the wind input voltmeter E-1320, and the wind output voltmeter E-1330, and actuators, e.g. the solar input voltage adjuster E-1410, wind input voltage adjuster E-1420, wind output voltage adjuster E-1430, and the charge regulator E-1200, described in this disclosure.

Further, other input devices may be connected to an I/O interface D-1016 as peripherals or as part of the controller D-1000. For example, a keyboard or a pointing device such as a mouse D-1020 may control parameters of the various processes and algorithms of this disclosure, and may be connected to the I/O interface D-1016 to provide additional functionality and configuration options, or to control display characteristics. Actuators D-1022 which may be embodied in any of the elements of the apparatuses described in this disclosure may also be connected to the I/O interface D-1016.

The above-noted hardware components may be coupled to the network D-1024, such as the Internet or a local intranet, via a network interface D-1026 for the transmission or reception of data, including controllable parameters to a mobile device. A central BUS D-1028 may be provided to connect the above-noted hardware components together, and to provide at least one path for digital communication there between.

The foregoing discussion discloses and describes merely exemplary embodiments of an object of the present disclosure. As will be understood by those skilled in the art, an object of the present disclosure may be embodied in other specific forms without departing from the spirit or essential characteristics thereof. Accordingly, the present disclosure is intended to be illustrative, but not limiting of the scope of an object of the present disclosure as well as the claims.

Numerous modifications and variations on the present disclosure are possible in light of the above teachings. It is therefore to be understood that within the scope of the appended claims, the disclosure may be practiced otherwise than as specifically described herein.

What is claimed is:

1. A solar and wind energy harvesting system comprising:
   a support structure having:
      a pair of poles, and
      a plurality of transversal members that extends between the pair of poles;
   a plurality of transducers affixed to each transversal member of the plurality of transversal members;
   a plurality of photovoltaic cells, wherein each photovoltaic cell
      is suspended from a corresponding transducer of the plurality of transducers, receives sunlight to provide sunlight input electricity, and receives wind to bend the corresponding transducer which generates wind input electricity;
   a battery assembly having:
      a charge regulator to receive the sunlight input electricity and the wind input electricity and provide a regulated input electricity,
      a battery to receive the regulated input electricity,
      a solar input voltmeter positioned between the plurality of photovoltaic cells and the charge regulator to provide solar voltage readings commensurate with solar voltage values of the solar input electricity, and
      a wind output voltage adjuster positioned between the battery and the plurality of transducers to provide a wind output electricity to the plurality of transducers; and
   an electrical control unit configured to
      receive the solar voltage readings and the wind voltage readings,
      determine an optimum position of the plurality of photovoltaic cells based on the solar voltage readings and the wind voltage readings, and
      actuate the plurality of transducers to position the plurality of photovoltaic cells at the optimum position.

2. The solar and wind energy harvesting system of claim 1, wherein the support structure is articulable between an extended position and a folded position, wherein in the extended position the poles are distant form each other and in the folded position the poles are substantially adjacent to each other.

3. The solar and wind energy harvesting system of claim 2, wherein each transversal member of the plurality of transversal members include a pivot to articulate the support structure between the extended position and the folded position.

4. The solar and wind energy harvesting system of claim 3, wherein each transversal member is a cable to articulate the support structure between the extended position and the folded position.

5. The solar and wind energy harvesting system of claim 1, wherein each transducer of the plurality of transducers is a multilayered laminated element.

6. The solar and wind energy harvesting system of claim 5, wherein each transducer includes a top layer, a bottom layer, and a middle layer sandwiched between the top layer and the bottom layer.

7. The solar and wind energy harvesting system of claim 6, wherein the top layer and the bottom layer contain polarizing electrical materials and the middle layer contains electrical conductive material.

8. The solar and wind energy harvesting system of claim 7, wherein the polarizing electrical materials are piezoelectric ceramic materials.

9. The solar and wind energy harvesting system of claim 1, wherein the battery assembly includes an electrical connection to distribute the regulated energy stored in the battery.

10. A solar and wind energy harvesting system comprising:
    a support structure having:
       a pair of poles, and
       a plurality of transversal members that extends between the pair of poles;
    a plurality of transducers affixed to each transversal member of the plurality of transversal members;
    a plurality of photovoltaic cells, wherein each photovoltaic cell
       is suspended from a corresponding transducer of the plurality of transducers and receives sunlight to provide sunlight input electricity and receives wind to bend the corresponding transducer which generates wind input electricity; and
    a battery assembly that is electrically connected to the plurality of transducers and the plurality of photovoltaic cells to receive, regulate and store the solar input electricity and the wind input electricity.

11. The solar and wind energy harvesting system of claim 10, wherein the support structure is articulable between an extended position and a folded position, wherein in the folded position the poles are substantially adjacent to each other.

12. The solar and wind energy harvesting system of claim 11, wherein each transversal member of the plurality of transversal members include a pivot to articulate the support structure between the extended position and the folded position.

13. The solar and wind energy harvesting system of claim 12, wherein each transversal member is a cable to articulate the support structure between the extended position and the folded position.

14. The solar and wind energy harvesting system of claim 10, wherein each pole of the pair of poles includes a wedged extremity to be inserted into a ground surface.

15. The solar and wind energy harvesting system of claim 10, wherein each transducer of the plurality of transducers is a multilayered laminated element.

16. The solar and wind energy harvesting system of claim 15, wherein the transducer includes a top layer, a bottom layer, and a middle layer sandwiched between the top layer and the bottom layer.

17. The solar and wind energy harvesting system of claim 16, wherein the top layer and the bottom layer contain polarizing electrical materials and the middle layer contain electrical conductive material.

18. The solar and wind energy harvesting system of claim 17, wherein the polarizing electrical materials are piezoelectric ceramic materials.

19. The solar and wind energy harvesting system of claim 10, wherein the battery assembly includes a charge regulator that receives the sunlight input electricity and the wind input electricity and provides a regulated input electricity to a battery to store the regulated electricity.

20. The solar and wind energy harvesting system of claim 19, wherein the battery assembly includes an electrical connection to distribute the regulated energy stored in the battery.

* * * * *